(12) United States Patent
Lee et al.

(10) Patent No.: US 12,187,417 B2
(45) Date of Patent: Jan. 7, 2025

(54) RETRACTABLE LANDING GEAR SYSTEM WITH MAGNETIC UPLOCKS

(71) Applicant: SAFRAN LANDING SYSTEMS CANADA INC., Ajax (CA)

(72) Inventors: Randy Lee, Oshawa (CA); Zoran Pasic, Etobicoke (CA); Michael Saccoccia, Seagrave (CA)

(73) Assignee: SAFRAN LANDING SYSTEMS CANADA INC., Ajax (CA)

( * ) Notice: Subject to any disclaimer, the term of this patent is extended or adjusted under 35 U.S.C. 154(b) by 81 days.

(21) Appl. No.: 18/310,382

(22) Filed: May 1, 2023

(65) Prior Publication Data
US 2024/0367780 A1 Nov. 7, 2024

(51) Int. Cl.
*B64C 25/26* (2006.01)
*B64C 25/24* (2006.01)

(52) U.S. Cl.
CPC .............. *B64C 25/26* (2013.01); *B64C 25/24* (2013.01)

(58) Field of Classification Search
CPC .................... B64C 25/001–30; B64U 60/40
See application file for complete search history.

(56) References Cited

U.S. PATENT DOCUMENTS

| 8,109,465 B1 | 2/2012 | Heer |
| 2024/0059401 A1* | 2/2024 | Luxmoore ............. B64U 60/30 |

FOREIGN PATENT DOCUMENTS

| CN | 201358643 Y | 12/2009 | |
| CN | 204210730 U | 3/2015 | |
| CN | 116853498 A | * 10/2023 | |
| WO | WO-2019128446 A1 | * 7/2019 | ............. B64C 25/26 |

OTHER PUBLICATIONS

Merged translation of CN 116853498 A (Year: 2023).*
Merged translation of WO 2019128446 A1 (Year: 2019).*

* cited by examiner

*Primary Examiner* — Philip J Bonzell
*Assistant Examiner* — Colin Zohoori
(74) *Attorney, Agent, or Firm* — CHRISTENSEN O'CONNOR JOHNSON KINDNESS PLLC (57) ABSTRACT

A landing gear system includes a landing gear assembly coupled to a body of a vehicle and configured for reciprocating motion between a retracted position and an extended position. A fail-secure uplock assembly is reciprocal between a locked state and an unlocked state. A first electromagnet and a first permanent magnet are mounted to the body, and a second electromagnet and a second permanent magnet are mounted to a component of the landing gear assembly. The first and second electromagnets generate magnetic fields with reversible polarities. When the landing gear assembly is in the retracted position, the first permanent magnet is attracted to the second permanent magnet. The first electromagnet is attracted to the second electromagnet when the uplock assembly is in the locked state and is repelled by the second electromagnet when the uplock assembly is in the unlocked state.

15 Claims, 11 Drawing Sheets

RETRACTABLE LANDING GEAR SYSTEM WITH MAGNETIC UPLOCKS

BACKGROUND

Modern aircraft landing gear is typically retractable, i.e., reciprocal between a deployed position and a stowed position. In the deployed position, the landing gear extends downward from the aircraft to engage a ground surface and support the aircraft during takeoff, landing, and taxiing maneuvers. To improve aerodynamic efficiency, the landing gear is retracted to a stowed position when the aircraft is in flight. More specifically, the landing gear is stowed within a landing gear bay of the wing and/or the fuselage of the aircraft during flight. Maglev vehicles are known to use retractable landing gear in a similar manner to enable the landing gear to support the vehicle at a docking station and while limiting drag when the vehicle is travelling in the levitated state.

Retractable landing gear systems utilize uplock assemblies to mechanically lock the retracted landing gear in its stowed position. The uplock assemblies engage shortly after takeoff and secure the landing gear in place during the flight. Prior to touchdown, the uplocks unlock to allow the landing gear to deploy in anticipation of landing.

Figure 1:
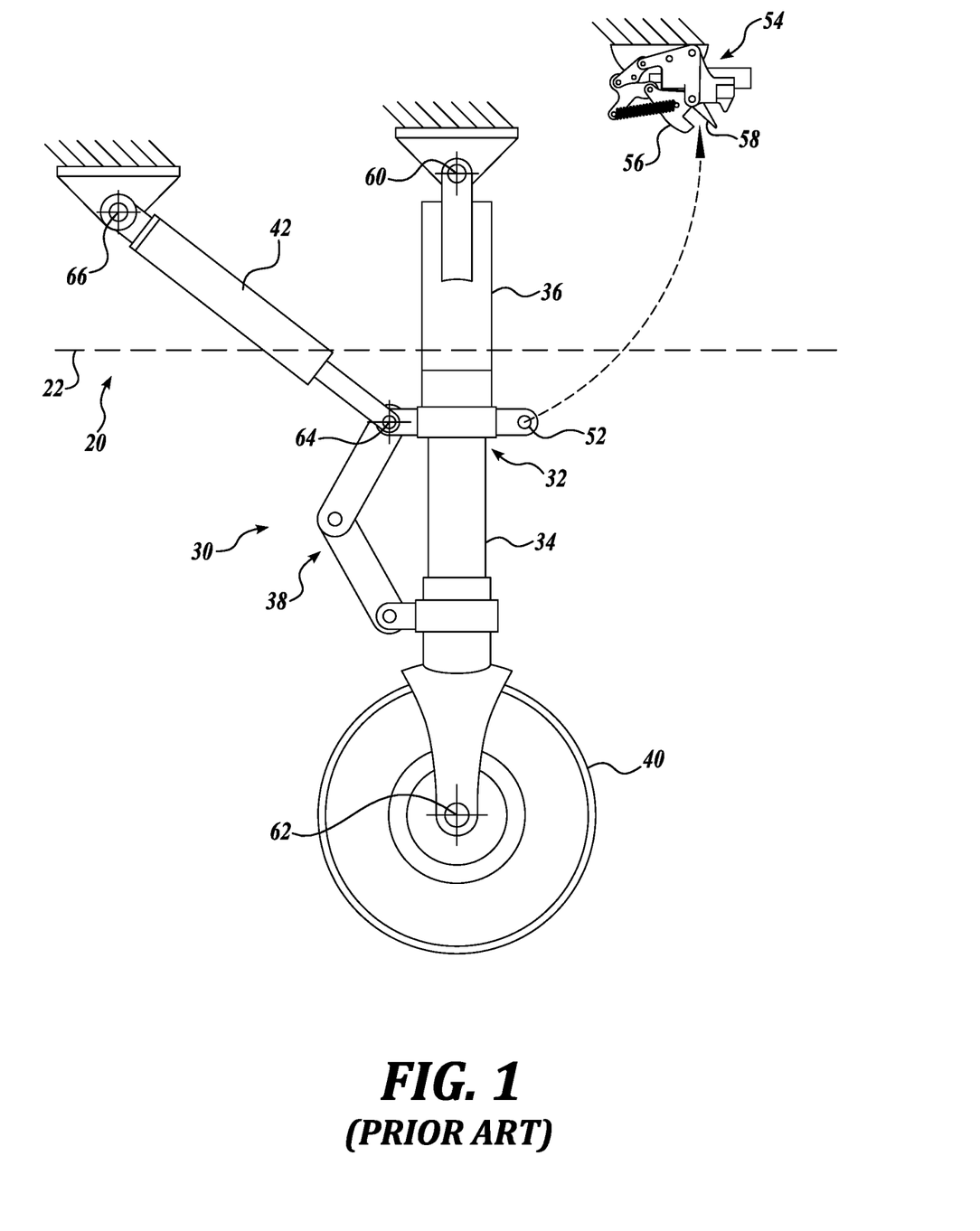
FIG. 1 shows a partially schematic side view of a known retractable landing gear assembly for a vehicle, wherein the landing gear assembly includes an uplock assembly, and the landing gear assembly is in a deployed position.
Figure 2:
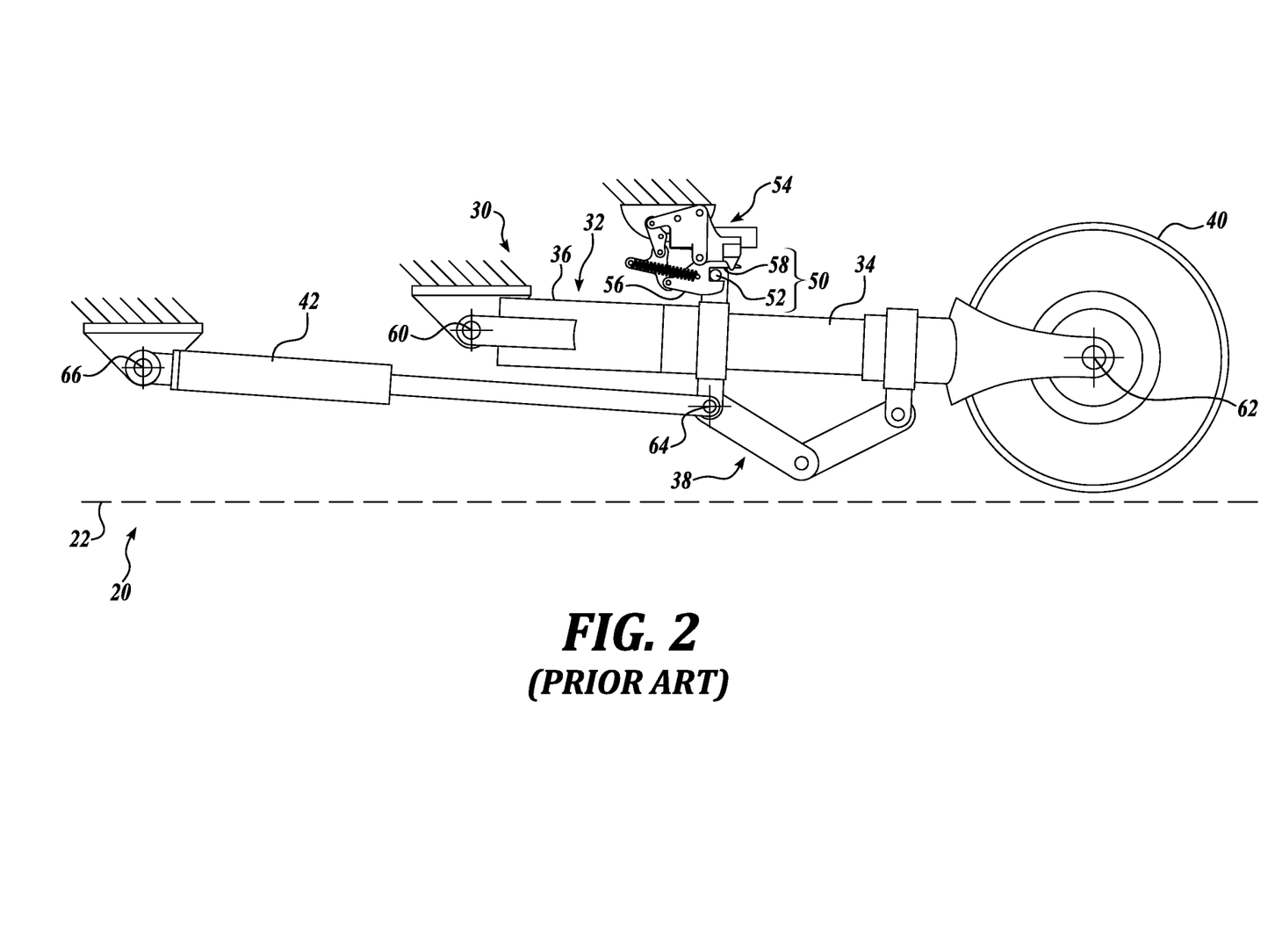
FIG. 2 shows a side view of the landing gear assembly of FIG. 1, wherein the landing gear assembly is in a stowed position, and the uplock assembly is engaged.

FIGS. 1 and 2 show an example of a known retractable landing gear assembly 30 for a vehicle 20, such as an aircraft, wherein FIG. 1 shows the assembly in a deployed (extended) state, and FIG. 2 shows the assembly in a stowed (retracted) state. As described in further detail, the landing gear assembly 30 also includes a known uplock assembly 50 that mechanically locks the landing gear assembly in the stowed position during flight.

The landing gear assembly 30 (referred to hereafter as "the landing gear" or "the landing gear 30") includes a shock strut 32, one end of which is rotatably coupled about an axis 90 to the fuselage 22. The shock strut includes a piston 34, a portion of which is slidingly disposed within a cylinder 36. One or more wheels 40 are rotatably associated with the shock strut 32 about an axis 92 so that the wheels are in rolling engagement with the ground when the landing gear 30 is extended and supporting the vehicle 20. A torque link assembly 38 is connected at one end to the piston 34 and at the other end to the cylinder 36 to prevent rotation of the piston and associated wheel(s) 40 relative to the cylinder.

A linear actuator 42 is coupled at one end to the fuselage 22 for rotation about an axis 96. A second end of the actuator 42 is rotatably coupled to the cylinder 36 about axis 94. Extension of the actuator 42 rotates the shock strut 32 about axis 90 in a counterclockwise direction (as shown in FIGS. 1 and 2) to move the landing gear 30 toward the stowed position. Conversely, retraction of the actuator 42 rotates the shock strut 32 about axis 90 in a clockwise direction (as shown in FIGS. 1 and 2) to move the landing gear 30 toward the deployed position.

The landing gear 30 includes an uplock assembly 50 that mechanically locks the landing gear in the stowed position during flight. The uplock assembly 50 includes a pin 52 mounted to the shock strut 32 and oriented to be parallel to the axis 90 of rotation of the shock strut. An uplock 54 is mounted within the landing gear bay and includes a rotatable uplock fitting 56 with a slot 58. As the landing gear 30 nears the stowed position, the slot 58 receives the pin 52. With the pin 52 disposed within the slot 58, the fitting 56 rotates as the landing gear 30 continues toward the stowed position. When the landing gear 30 is in the stowed position, the fitting 56 has rotated to and locked in a position wherein engagement of the pin 52 with the slot 58 maintains the landing gear 30 in stowed position, even in the event of an actuator 42 failure. When the landing gear 30 is to be deployed, the fitting 56 rotates in the opposite direction, releasing the pin 52 from the slot 58, thereby disengaging the landing gear 30 from the uplock assembly 50.

During operation, uplocks are subjected to the locking/unlocking impact loads, inertia loads, and spring loads (from springs frequently used as a part of uplock assembly). Due to the magnitude of the loads to which the uplocks are subjected, uplocks require significant load capacity, which adds substantial weight to the landing gear, and more generally, to the aircraft.

U.S. Pat. No. 8,109,465 ("the '465 Patent"), which issued on Feb. 7, 2012, and is currently assigned to Textron Innovations Inc., discloses a simplified uplock system. More specifically, the '465 Patent, the disclosure of which is expressly incorporated in its entirety herein, utilizes a pair of electromagnets coupled to the airframe to retain the landing gear in a fully retracted position. When the landing gear is in the stowed position and one or both electromagnets are energized, the energized electromagnet(s) attract a magnetically responsive material disposed on or integral with the landing gear with sufficient force to retain the landing gear in the stowed position. The '465 Patent further teaches that the electromagnets are "fail-safe" electromagnets, i.e., when the electromagnets are de-energized, the magnetic attraction that holds the landing in the stowed position ceases.

Figure 3:
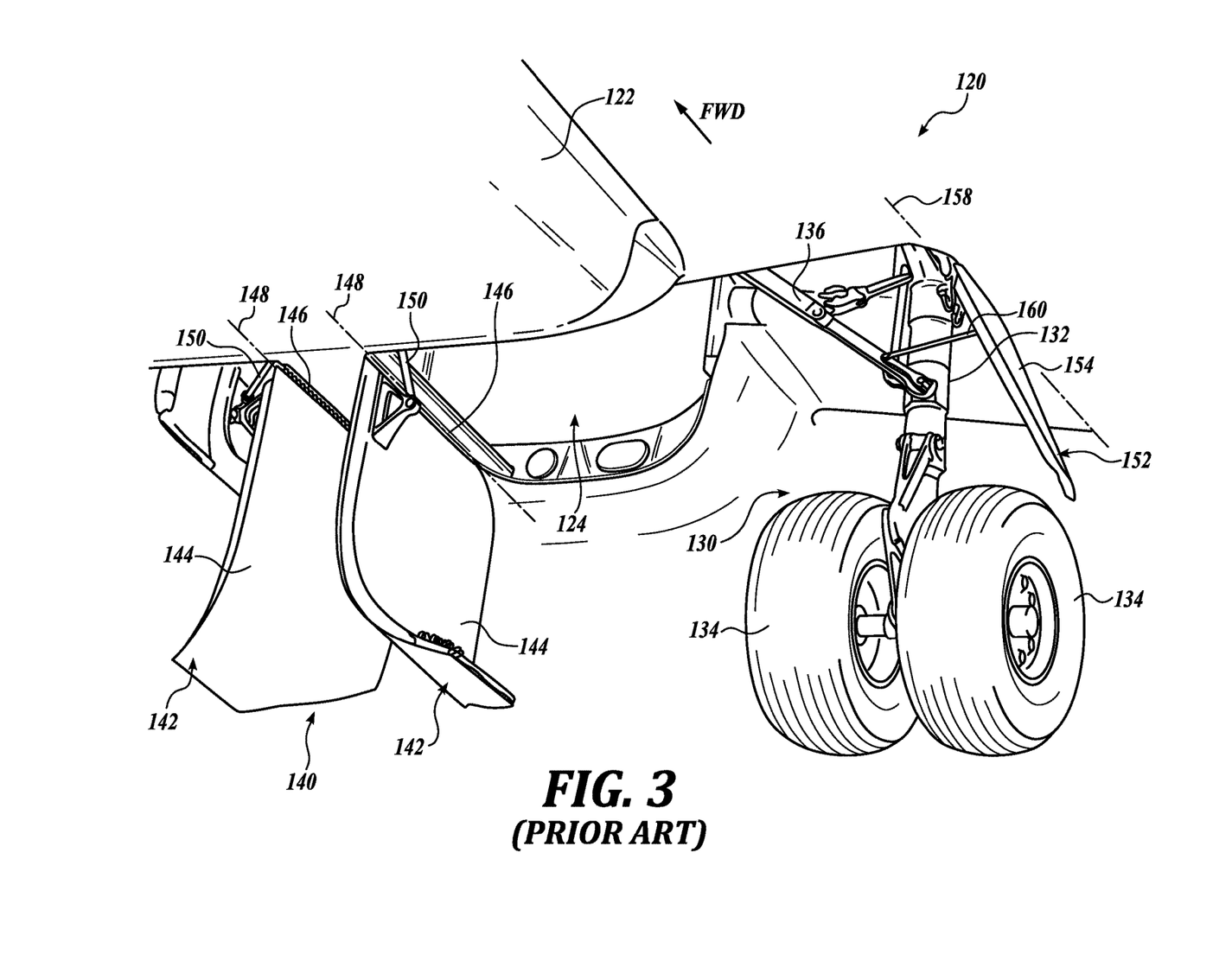
FIG. 3 shows an isometric view of a known landing gear door assembly, wherein the associated landing gear assembly is in a deployed position.

FIG. 3 shows a partial isometric view of a vehicle 120, such as an aircraft, with a landing gear door assembly 140 and an associated landing gear assembly 130. When the landing gear assembly 130 is retracted into the landing gear bay 124, the landing gear door assembly 140 is closed, i.e., also retracted so that the closed landing gear door assembly 140 covers the landing gear bay 124. When the landing gear assembly 130 is deployed, the landing gear door assembly 140 is open.

As shown, the landing gear assembly 130 includes a shock strut 132 rotatably mounted to the aircraft 120, and a pair of wheels 134 is rotatably mounted to the shock strut. The landing gear assembly 130 extends and deploys by rotating about a generally streamwise axis of rotation (not shown). When the landing gear assembly 130 is in the extended position, a collapsible side brace 136 extends between the fuselage 122 and the shock strut 132 to selectively lock the landing gear assembly in the deployed position of FIG. 3.

The landing gear door assembly 140 includes a pair of inboard doors 142 and a pair of corresponding outboard doors 152. Each inboard door 142 cooperates with one of the outboard doors 152 to cover a portion of the landing gear bay 124 when a corresponding landing gear assembly 130 is in the stowed position.

The inboard door 142 includes a panel 144 rotatably mounted about a generally streamwise axis 148 by a hinge 146. A drive rod 150 is driven by or forms part of an actuator (not shown). The drive rod 150 is coupled to the door panel 144 to selectively rotate the door panel about axis 148 between an opened position and a closed position.

The outboard door 152 includes a panel 154 rotatably mounted about a generally streamwise axis 158 by a hinge (not shown). A drive rod 160 is coupled at one end to the door panel 154 and at the other end to the side brace 136 or other suitable landing gear component. As the landing gear assembly 130 extends and retracts, the resulting movement of the drive rod 160 opens and closes, respectively, the outboard door 152.

Similar to landing gear assemblies, landing gear door assemblies often include uplock assemblies to selectively secure the landing gear doors in the closed position when the aircraft is in flight. The uplock assemblies reduce wear and tear on the actuators and also help reduce unwanted vibration.

Known mechanical uplocks assemblies are typically actuated by hydraulic actuators. Further, because of the loads experienced during flight, in particular, mechanical uplocks require robust components. As a result of these factors, mechanical uplock assemblies are complex and add significant weight to the vehicles on which they are installed. Further, the complexity of the uplock designs, particularly the hydraulic actuation portions, add potential failure points to the landing gear system that require more frequent maintenance.

Known uplock assemblies that utilize electromagnets also have their shortcomings. These uplocks, such as the ones disclosed in the '465 Patent, utilize fail-safe electromagnets, i.e., electromagnets that lose functionality in the event of a power loss. Accordingly, such uplock systems require redundant electromagnets and power sources to account for potential failures. These redundancies add undesirable weight and complexity to the landing gear systems.

SUMMARY

Embodiments of landing gear and landing gear door assemblies with magnetic uplocks are set forth below according to technologies and methodologies of the present disclosure. The uplocks are configured such one or more power failures will not result in the uncommanded release of the uplock assembly. Further, the uplocks selectively provide attractive and repelling forces that assist in the retraction and extension, respectively, of the landing gear.

A first representative embodiment of a landing gear system includes a landing gear assembly coupled to a body of a vehicle and configured for reciprocating motion between a retracted position and an extended position. A fail-secure uplock assembly is reciprocal between a locked state and an unlocked state. A first electromagnet and a first permanent magnet are mounted to the body, and a second electromagnet and a second permanent magnet are mounted to a component of the landing gear assembly. The first and second electromagnets generate magnetic fields with reversible polarities. When the landing gear assembly is in the retracted position, the first permanent magnet is attracted to the second permanent magnet. The first electromagnet is attracted to the second electromagnet when the uplock assembly is in the locked state and is repelled by the second electromagnet when the uplock assembly is in the unlocked state.

In any embodiment, the landing gear component is a shock strut.

In any embodiment, the landing gear component is a landing gear door.

In any embodiment, the landing gear system further comprises a controller in operable communication with the first and second electromagnets, the controller being programmed to reverse a current supplied to one of the first and second electromagnets to move the uplock assembly from the locked state to the unlocked state.

In any embodiment, the first electromagnet comprises a first electrically conductive wire coiled around a first ferromagnetic core.

In any embodiment, the second electromagnet comprises a second electrically conductive wire coiled around a second ferromagnetic core.

In any embodiment, the landing gear system further comprises a power source configured to provide an electric current to the first and second electrically conductive wires.

In any embodiment, the landing gear system further comprises a controller programmed to control a direction and a power of the current supplied by the power source to each of the first and second electrically conductive wires.

In any embodiment, the landing gear system further comprises an input device in operable communication with the controller, wherein the controller is programmed to stop the current supplied to each of the first and second electrically conductive wires in response to a signal from the input device.

In any embodiment, the landing gear system further comprises a position sensor configured to sense a position of the landing gear assembly component and to send a corresponding signal to the controller.

In any embodiment, the controller is programmed to control the power of the current provided to the first and second electrically conductive wires according to the position sensed by the position sensor.

According to another aspect of the present disclosure, a landing gear assembly for a vehicle having a fuselage includes a shock strut mounted to the fuselage for reciprocating movement between a stowed position and a deployed position. The landing gear assembly further includes an uplock configured to selectively retain the shock strut in the stowed position. The uplock assembly has a first electromagnet and a first permanent magnet mounted to the shock strut and a second electromagnet and a second permanent magnet fixedly mounted relative to the fuselage. A power source is configured to provide an electrical current to the first and second electromagnets, and a controller programmed to selectively control a direction and power of the electrical current supplied to each of the first and second electromagnets. The first and second electromagnets are attracted to each other when the uplock is in an engaged state, and the first and second electromagnets are repelled from each other when the uplock is in a disengaged state.

In any embodiment, the first and second permanent magnets are attracted to each other, and a force repelling the first and second electromagnets is greater than a force attracting the first and second permanent magnets when the shock strut is in the stowed position and the uplock is in the disengaged state.

According to another aspect of the present disclosure, a landing gear system for a vehicle is provided. The landing gear system includes a landing gear assembly coupled to a body of the vehicle and configured for reciprocating motion between a retracted position and an extended position. The landing gear system further includes a fail-secure uplock assembly that is reciprocal between a locked state and an unlocked state. The uplock assembly has a first electromagnet fixedly positioned relative to one of the body of the vehicle and a landing gear assembly component. The first electromagnet includes a first solenoid configured to generate a first electromagnetic field with a reversible polarity and a first permanent magnet. The uplock assembly also has a second permanent magnet fixedly positioned relative to the other of the body of the vehicle and the landing gear assembly component. The first electromagnet is proximate to the second permanent magnet when the landing gear assembly is in the retracted position. The first permanent magnet is attracted to the second permanent magnet, the first solenoid is attracted to the second permanent magnet when the uplock assembly is in the locked state, and the first solenoid is repelled by the first permanent magnet when the uplock assembly is in the unlocked state.

In any embodiment, when the uplock assembly is in the unlocked state, a repelling force between the first solenoid and the second permanent magnet is greater than an attracting force between the first and second permanent magnets.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this disclosed subject matter will become more readily appreciated as the same become better understood by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Examples of a landing gear assemblies for vehicles are set forth below according to technologies and methodologies of the present disclosure. In an embodiment a landing gear assembly includes an uplock that uses a pair of selectively energized electromagnets. In an embodiment, a landing gear door assembly includes an uplock that uses a pair of selectively energized electromagnets. As will be described in further detail, the electromagnets are configured to provide a fail-secure locking mechanism that maintains the locked state in the event of a power failure. In an embodiment, the polarity of the electromagnets is selectively reversible so that the uplock is capable of providing an attractive force or a repellant force.

While the present disclosure describes various embodiments of retractable landing gear for aircraft, it will be appreciated that the use of such landing gear is not limited to aircraft, and that other implementations, such as on maglev vehicles or any other suitable vehicles, should be considered within the scope of the present disclosure.

Figure 4:
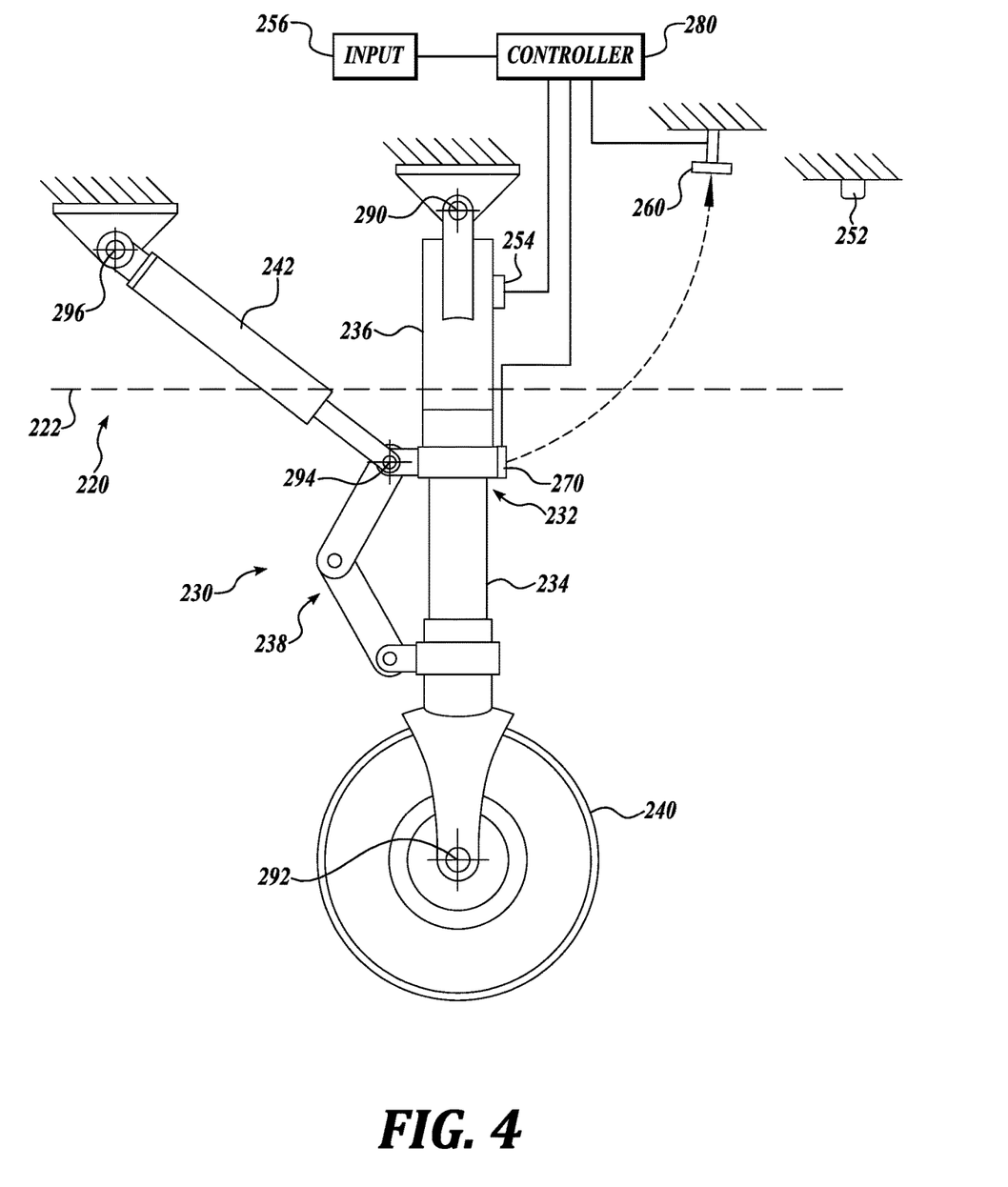
FIG. 4 shows a partially schematic side view of a retractable landing gear assembly for a vehicle according to aspects of the present disclosure, wherein the landing gear assembly includes an uplock assembly, and the landing gear assembly is in a deployed position.
Figure 5:
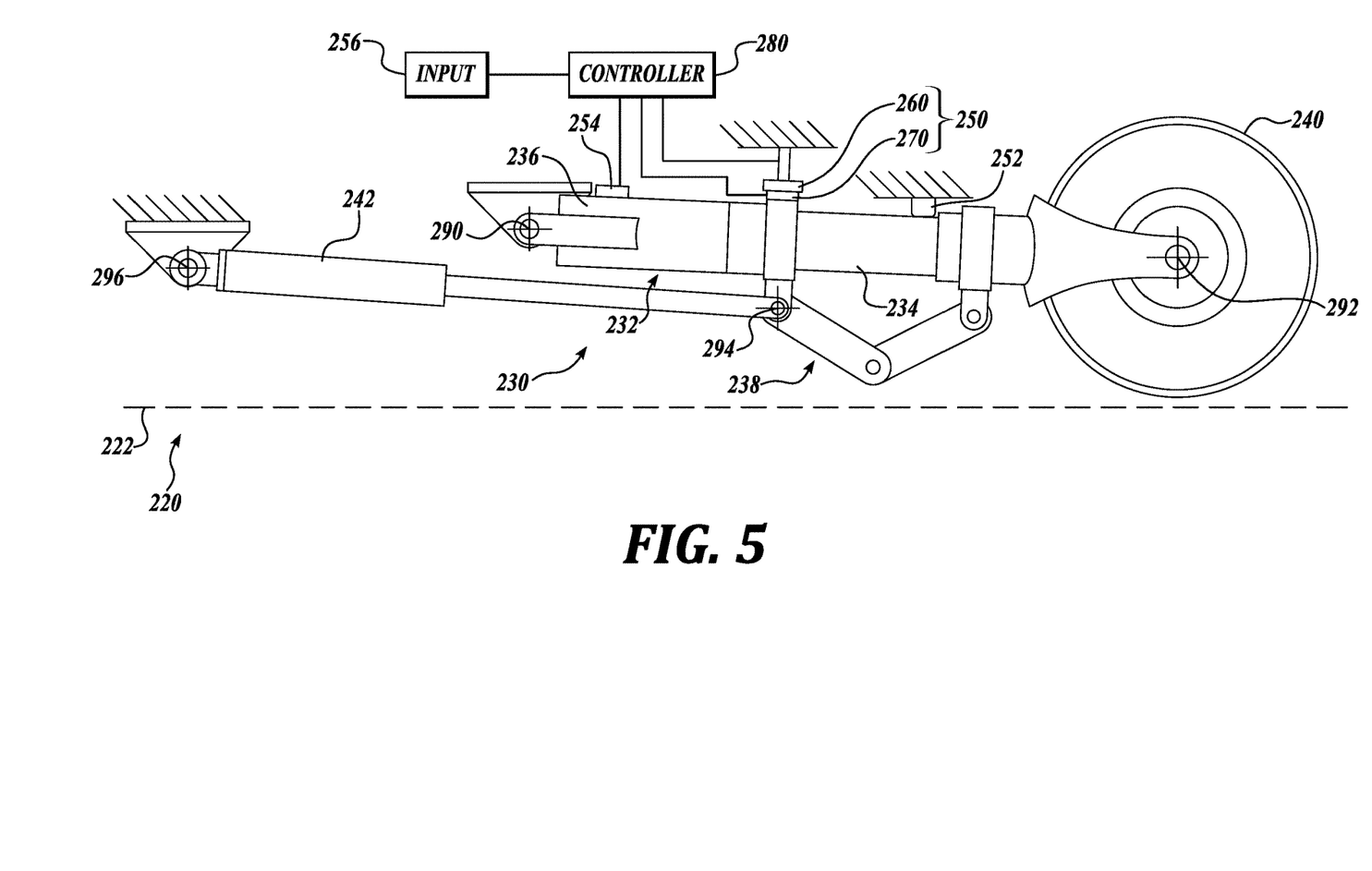
FIG. 5 shows a partially schematic side view of the landing gear assembly of FIG. 4, wherein the landing gear assembly is in a stowed position, and the uplock assembly is in a locked state.

FIGS. 4 and 5 show an embodiment of a landing gear assembly 230 in an extended position and a retracted position, respectively. The landing gear assembly 230 (referred to hereafter as "the landing gear" or "the landing gear 230") is suitable for use with an aircraft 220.

The landing gear 230 shown in FIGS. 4 and 5 is similar to the previously described landing gear 30 of FIGS. 1 and 2, wherein parts of the landing gear 230 indicated with reference number 2XX correspond to parts of the landing gear 30 indicated with reference number XX except as otherwise noted. For example, the shock strut 232 and actuator 242 shown in FIGS. 4 and 5 are similar in form and function to the shock strut 32 and actuator 42, respectively, shown in FIGS. 1 and 2 except as noted. For the sake of brevity, components of the landing gear 230 will not be described again with the understanding that the description of the corresponding component of previously described landing gear 30 applies.

The landing gear 230 includes an uplock assembly 250 that selectively locks the landing gear in the stowed position of FIG. 5. In an embodiment, the uplock assembly 250 includes a first electromagnet 260 fixedly mounted within the landing gear bay. That is, the first electromagnet is fixedly positioned relative to the fuselage 222 of the aircraft, i.e., the body of the vehicle. A second electromagnet 270 is mounted to a moveable portion of the landing gear 230 structure. In the illustrated embodiment, the second electromagnet 270 is coupled to the cylinder 236 of the shock strut 232. In an embodiment, the second electromagnet 270 is coupled to any suitable portion of the landing gear 230.

The first electromagnet 260 and the second electromagnet 270 are in operable communication with a controller 280. The controller 280 is programmed to selectively control the polarity and strength of the electromagnetic field produced by each of the first and second electromagnets 260 and 270. As will be explained in further detail, because the polarity and strength of the magnetic fields generated by the electromagnets 260 and 270 is selectively varied by the controller 280, the electromagnets (1) attract each other to maintain the landing gear 230 in the stowed position and (2)

repel each other when the landing gear begins a deployment motion in order to urge the landing gear toward the extended position.

In some embodiments, the controller 280 includes a processor and memory. The memory may include computer readable storage media in read-only memory (ROM), random-access memory (RAM), and keep-alive memory (KAM), for example. The KAM may be used to store various operating variables or program instructions while the processor is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, instructions, programs, modules, etc.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure. Similarly, the terms "module" and "unit" can include logic that may be implemented in either hardware or software, or combinations thereof.

In some embodiments, the processor of the controller 280 executes instructions stored in memory. These instructions may include, for example, a set of algorithms, including resident program instructions stored in one of the storage mediums and executed to provide desired functions. In some embodiments, the set of instructions, when executed by the controller 280, carries out, for example, one or more of steps of, and in some embodiments all of the steps of, the method 500 set forth in FIG. 11.

Figure 6:
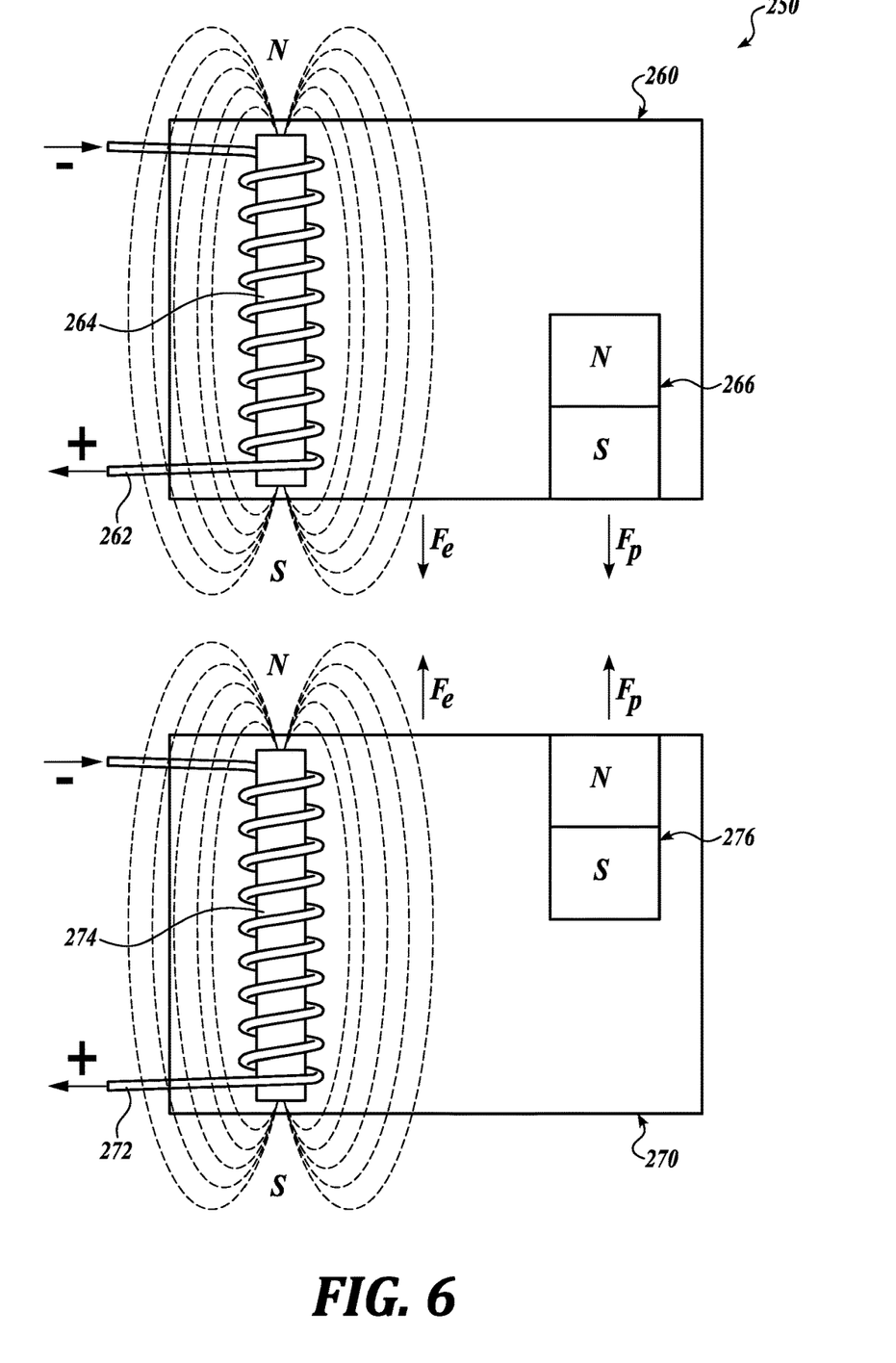
FIG. 6 shows a schematic view of the uplock assembly of FIG. 5, wherein the uplock assembly is in the locked state.
Figure 7:
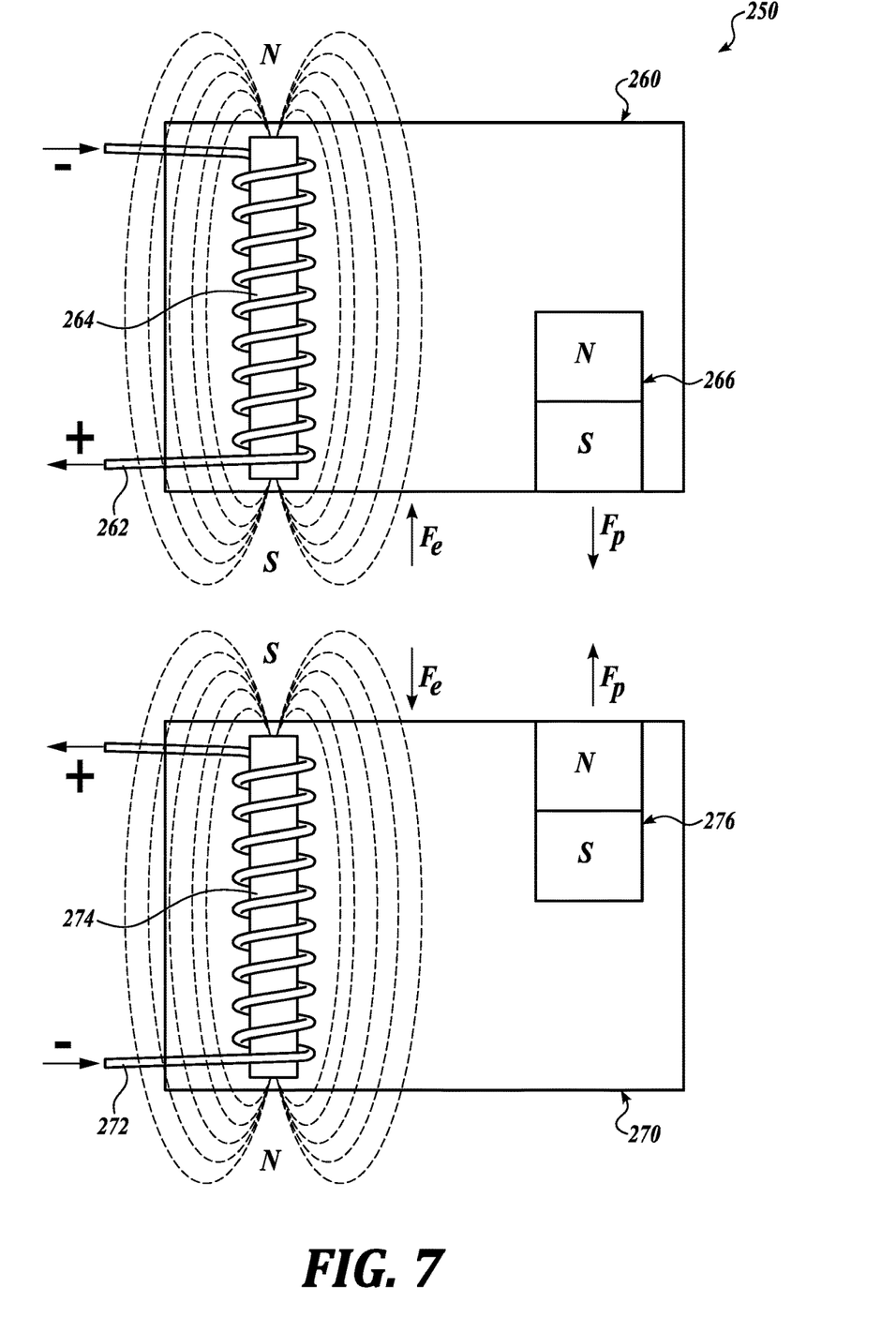
FIG. 7 shows a schematic view of the uplock assembly of FIG. 6, wherein the uplock assembly is in an unlocked locked state.

Referring now to FIGS. 6 and 7, embodiments of the first electromagnet 260 and the second electromagnet 270 are shown. In an embodiment, the first electromagnet 260 includes an electrically conductive wire 262 wound around a ferromagnetic core 264 to form a solenoid. The conductive wire 262 receives a flow of electrical current from a power source (not shown) to produce a magnetic field around the solenoid. The polarity of the first electromagnet 260 is reversible by reversing the direction of the current flowing through the conductive wire 262. In addition, the intensity, i.e., strength, of the magnetic field increases and decreases in proportion to the current flowing through the conductive wire. Accordingly, by controlling the direction and power of the electrical current supplied to the electromagnet 260, the controller 280 controls the polarity and strength of the magnetic field generated by the first electromagnet.

The first electromagnet 260 also includes a permanent magnet 266. In an embodiment, the permanent magnet 266 is integral with the first electromagnet 260. In an embodiment, the permanent magnet is separate from but mounted proximate to the first electromagnet 260.

Similar to the first electromagnet 260, the second electromagnet 270 includes an electrically conductive wire 272 wound around a ferromagnetic core 274. The second electromagnet 270 also includes an integral or associated permanent magnet 276.

Referring specifically to FIG. 6, the uplock assembly 250 is shown in a locked state. In the locked state, the first electromagnet 260 is positioned proximate to the second electromagnet 270. The controller 280 controls the current supplied to the first and second electromagnets 260 and 270 such that the pole of one of the electromagnets is proximate to the opposite pole of the other electromagnet. That is, the north pole N of the first electromagnet 260 is proximate to the south pole S of the second electromagnet 270 or the south pole S of the first electromagnet is proximate to the north pole N of the second electromagnet. The magnetic fields produced by the location and relative polarity of the first and second electromagnets 260 and 270 generate a force Fe that attracts the first and second electromagnets to each other.

In the locked position, the permanent magnet 266 of the first electromagnet 260 is positioned proximate to the permanent magnet 276 of the second electromagnet 270. Further, the permanent magnets 266 and 276 are oriented so that the pole of one of the permanent magnets is proximate to the opposite pole of the other permanent magnet. As a result, the permanent magnets 266 and 276 generate a force Fp that attracts the first and second permanent magnets to each other.

The use of the disclosed combination of electromagnets 260 and 270 provide a "fail-secure" uplock assembly 250. Unlike known fail-safe electromagnet uplocks, fail-secure electromagnetic uplocks continue to secure the landing gear assembly 230 in the stowed position, even in the event of a failure of one or both electromagnets 260 and 270. Such failures can occur, for example, due to power failure, Foreign Object Damage (FOD), or other circumstances. In the case of the disclosed uplock assembly 250, if one or both electromagnets fail, the force Fp generated by the permanent magnets 266 and 276 is sufficient to maintain the landing gear in the stowed position. That is, the attractive force Fp between (1) the permanent magnet 266 fixedly positioned relative to the fuselage and (2) the permanent magnet 276 fixedly positioned relative to a component of the landing gear is sufficient to maintain the landing gear in the stowed position, even in the absence of any further attractive force Fe of the electromagnets. In the event of uplock electromagnet failure, the landing gear actuator, which is typically hydraulic, is capable of providing sufficient force to overcome the attractive force Fp generated by the permanent magnets 266 and 276. As a result, while the uplock assembly 250 will retain the landing gear 230 in the stowed position in the event that one or both electromagnets fail, a pilot is still able to deploy the landing gear.

Referring now to FIG. 7, the uplock assembly 250 is shown in an unlocked state as the landing gear 230 is beginning to move from the stowed position to the deployed position. To unlock the uplock assembly 250, the controller 280 reverses the current in the coil of one of the electromagnets 260 or 270. In the illustrated embodiment, the current is reversed in the coil 272 of the second electromagnet 270; however, in other embodiments, the current is reversed in the coil 262 of the first electromagnet 260.

Reversing the electrical current in the coil of one of the electromagnets reverses the polarity of that electromagnet. As a result, the pole of one electromagnet is proximate to the same pole of the other electromagnet, i.e., the north poles N of both magnets or the south poles S of both magnets are proximate to each other. The magnetic fields produced by the location and relative polarity of the first and second electromagnets 260 and 270 generate a force Fe that repels the first and second electromagnets from each other. This repellent force Fe, alone or in combination with the force of the landing gear actuator(s) is sufficient to overcome the attractive force Fp of the permanent magnets so that the landing gear 230 is able to move toward the deployed position.

In addition to locking the landing gear 230 in the stowed position during flight, the disclosed uplock assembly 250 also provides forces that supplement the actuator 242 forces that drive the landing gear in both the extension and retraction phases. During landing gear 230 retraction, the attractive force Fe of the electromagnets 260 and 270 pull the landing gear 230 toward the stowed position during the end of the retraction motion. Conversely, during the initial portion of the landing gear extension, the repellent force Fe of the electromagnets 260 and 270 drive the landing gear 230 toward the deployed position. The supplemental forces provided by the uplock assembly 250 reduce the actuating force required from the actuator 242. As a result, a smaller actuator can be used, which reduces weight as well as space required in the wheel well.

It will be appreciated that the disclosed electromagnets 260 and 270 are exemplary only and should not be considered limiting. In this regard, embodiments of the uplock assembly 250 can include any type of known electromagnets that incorporate permanent magnets and cooperate to provide a fail-secure electromagnetic uplock.

In another embodiment of an uplock, the second electromagnet is replaced by a second permanent magnet, which acts like an armature. When the uplock is locked and the first electromagnet is proximate to the second permanent magnet, the first solenoid and the first permanent magnet are both attracted to the second permanent magnet. When the uplock is switched to an unlocked state, the first solenoid is repelled by the first permanent magnet, while the first permanent magnet remains attracted to the second permanent magnet. Because the repelling force between the first solenoid and the second permanent magnet is greater than the attracting force between the first and second permanent magnets, the first electromagnet is repelled by the second permanent magnet. When the first electromagnet loses power, the attraction force between the first and second permanent magnets is sufficient to maintain function of the uplock until power is restored.

Referring again to FIGS. 4 and 5, a position sensor 254 is in operable communication with the controller 280 and is configured to send signals to the controller that correspond to the position of the landing gear 230. In an embodiment, the position sensor 254 is a proximity sensor mounted to the shock strut 232 and senses a position relative to a target (not shown) mounted within the landing gear bay, to the landing gear, or to any other suitable component. In an embodiment, the position sensor 254 is a rotary position sensor that measures the angle between two components. In an embodiment, the rotary position sensor measures an angle between the actuator 242 and the shock strut 232, the actuator and a component that is fixed relative to fuselage 222, the shock strut and a component that is fixed relative to the fuselage, or any other components for which the relative angle therebetween corresponds to a specific landing gear 230 position.

In an embodiment, the controller 280 is programmed to control the uplock assembly 250 to activate and de-activate according to the position of the landing gear 230. In an embodiment, the controller 280 is further programmed to control the uplock assembly 250 to activate and de-activate according to whether the landing gear 230 is extending or retracting. More specifically, the controller 280 is programmed to energize the electromagnets 260 and 270 to provide an attractive force therebetween as the landing gear 230 approaches the stowed position. In an embodiment, the controller 280 is programmed to vary the amount of current provided to one or both electromagnets 260 and 270 so that the magnitude of the attractive force increases or decreases as the landing gear 230 approaches the stowed position. In an embodiment, the controller is programmed to de-energize the electromagnets 260 and 270 when the landing gear 230 is moving toward the deployed position and has moved past a predetermined position.

Still referring to FIGS. 4 and 5, an elastic damper 252 is fixedly mounted within the landing gear bay. When the landing gear 230 is in the stowed position, the shock strut 232 or some other suitable landing gear component engages and compresses the damper 252. In addition to minimizing potential impact damage as the landing gear 230 reaches the stowed position, the preload force of the landing gear 230 against the damper 252 stabilizes the stowed landing gear to prevent unwanted vibration and chatter during flight.

In an embodiment, an input device 256 is in operable communication with the controller 280. In an embodiment, the input device 256 is located to enable an operator to send a signal to the controller 280 manually. In an embodiment, the signal causes the controller 280 to de-energize, i.e., to disengage the uplock assembly 250. In an embodiment, the signal changes one or both electromagnets 260 and 270 from a fail-safe mode to a fail-secure mode and vice versa.

Figure 8:
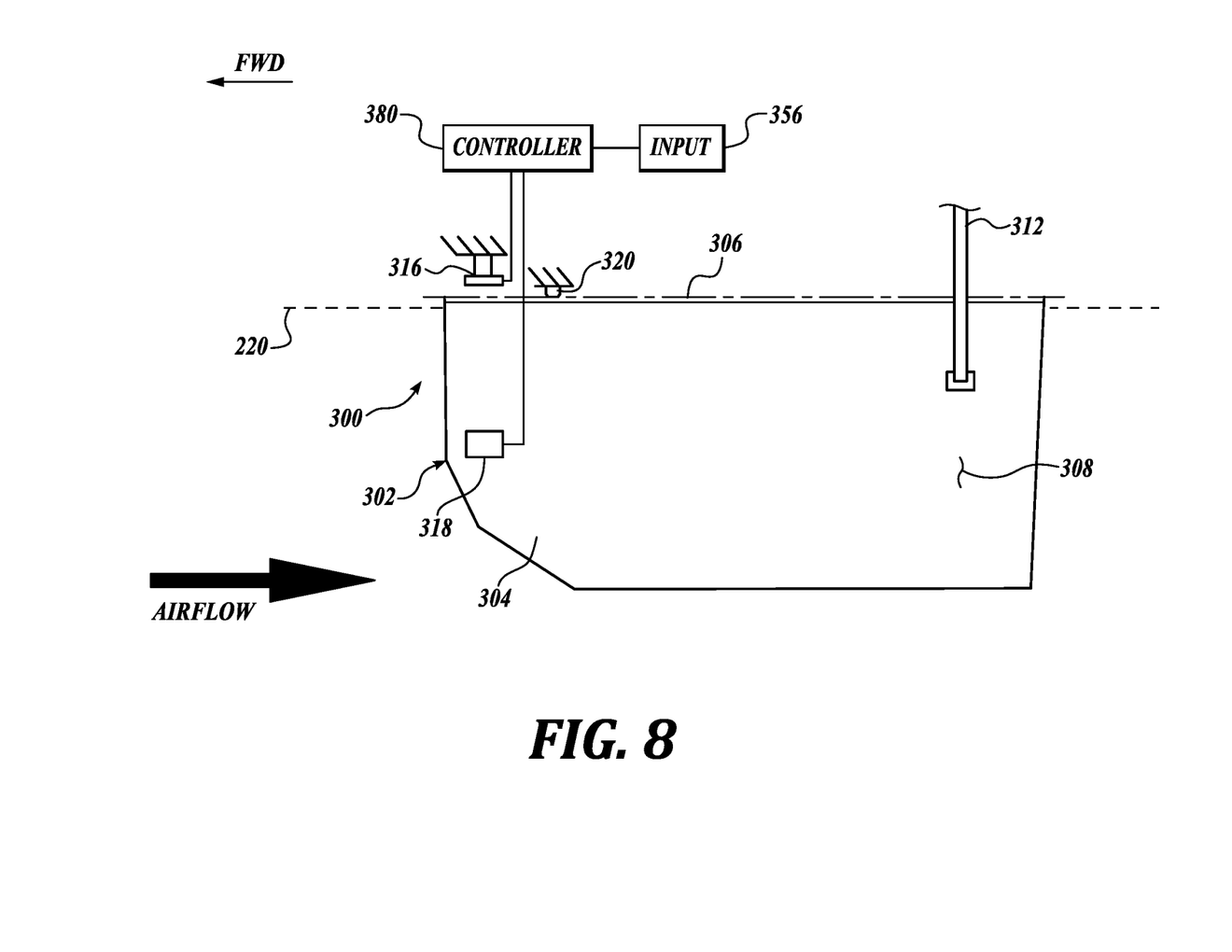
FIG. 8 shows a partially schematic side view of a landing gear door assembly for a vehicle according to aspects of the present disclosure, wherein the landing gear door assembly includes an uplock assembly, and the landing gear door assembly is in an open position.
Figure 9:
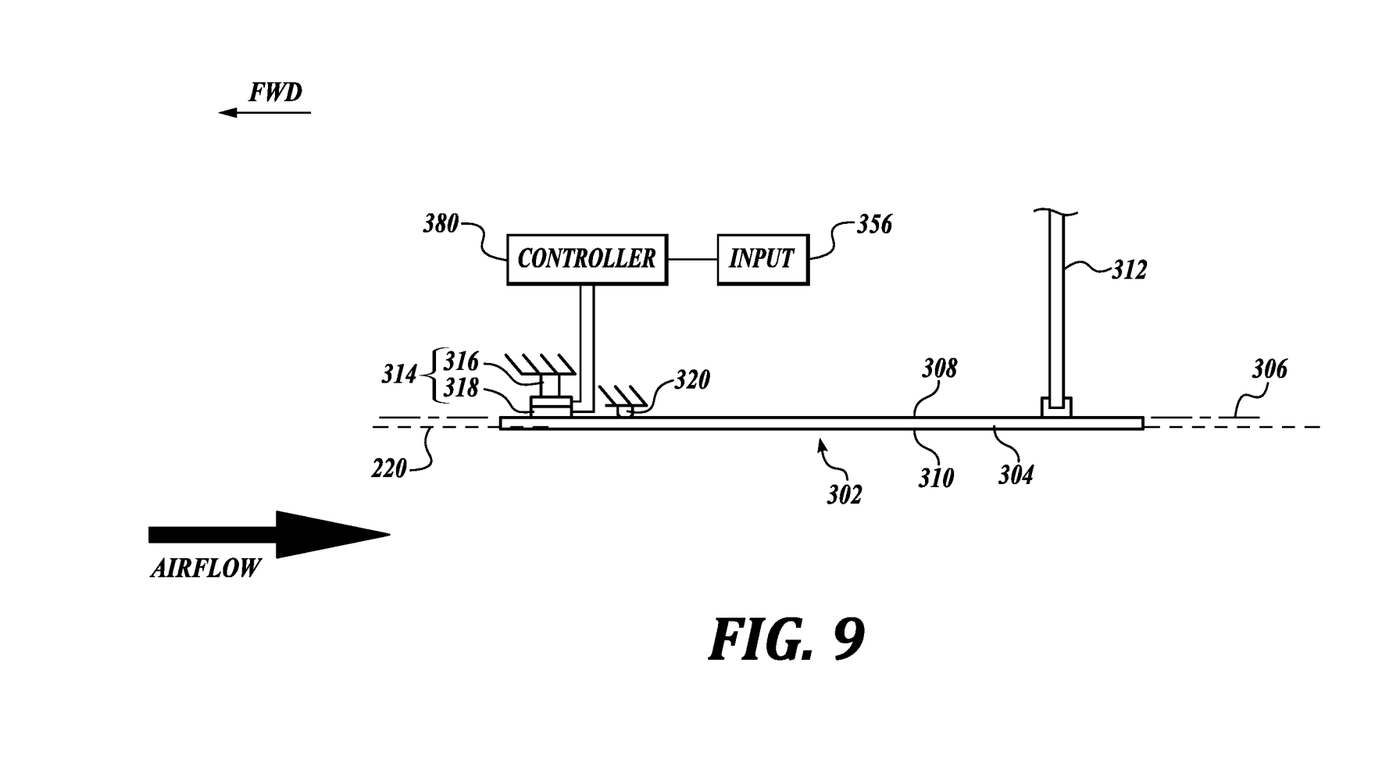
FIG. 9 shows a partially schematic side view of the landing gear door assembly of FIG. 8, wherein the landing gear door assembly is in a closed position, and the uplock assembly is engaged.

FIGS. 8 and 9 show an embodiment of a landing gear door assembly 300 ("door assembly") similar to the previously described inboard and outboard landing gear doors 142 and 152 shown in FIG. 3. The door assembly 300 includes a door 302 having a panel 304 rotatably coupled to the aircraft 220 about an axis 306. In an embodiment, the panel 304 is coupled to the aircraft 220 by a hinge. In an embodiment, the panel 304 is coupled to the aircraft 220 by a linkage or is secured directly to the landing gear. In an embodiment, the panel 304 does not rotate relative to the aircraft 220 but instead follows any suitable path as the door assembly 300 reciprocates between the open position of FIG. 8 and the closed position of FIG. 9. When the door assembly 300 is in the closed position, an inner surface 308 faces the landing gear bay, and an outer surface 310 is exposed to the airflow and provides an aerodynamic cover to at least a portion of the landing gear bay.

A drive rod 312 is rotatably or pivotally coupled to the door 302 to drive reciprocating motion of the door assembly 300 between the open and closed positions. In an embodiment, the drive rod 312 is a portion of or connected to an actuator that drives the motion of the door assembly 300. In an embodiment, the drive rod 312 is coupled to a landing gear component so that extension and retraction of the landing gear drives the motion of the door assembly 300. In an embodiment, the drive rod 312 is coupled to any suitable component or actuator to drive the motion of the door assembly 300.

The door assembly 300 includes an uplock assembly 314 that has a first electromagnet 316 fixedly positioned relative to the landing gear bay and a second electromagnet 318 fixedly coupled to the panel 304 of the landing gear door 302. The first and second electromagnets 316 and 318 are in operative communication with a controller 380, which is itself in operative communication with an input device 356. The uplock assembly 314, controller 380, and input device 356 are similar to the uplock assembly 250, controller 280, and input device 256 shown in FIGS. 4-7.

Similar to the previously disclosed uplock assembly 250, the uplock assembly 314 includes a pair of electromagnets that cooperate to provide a fail-secure means of selectively locking the door 302 in the closed position when the landing gear is stowed. When the landing gear begins a deployment motion, the uplock assembly 250 ceases its locking function and provides a force that biases the door 302 toward the open position.

The door assembly 300 further includes an elastic bumper 320 mounted within the cargo bay, to a component of the landing gear, or to any suitable structure. As the door assembly 300 approaches the closed position, the door panel 304 contacts the bumper 320 to react any impact loads without damaging the door panel. When the door assembly 300 is in the closed position, the door panel 304 at least partially compresses the bumper 320 so that the preload of the door panel 304 against the bumper 320 prevents unwanted vibration and chatter.

Figure 10:
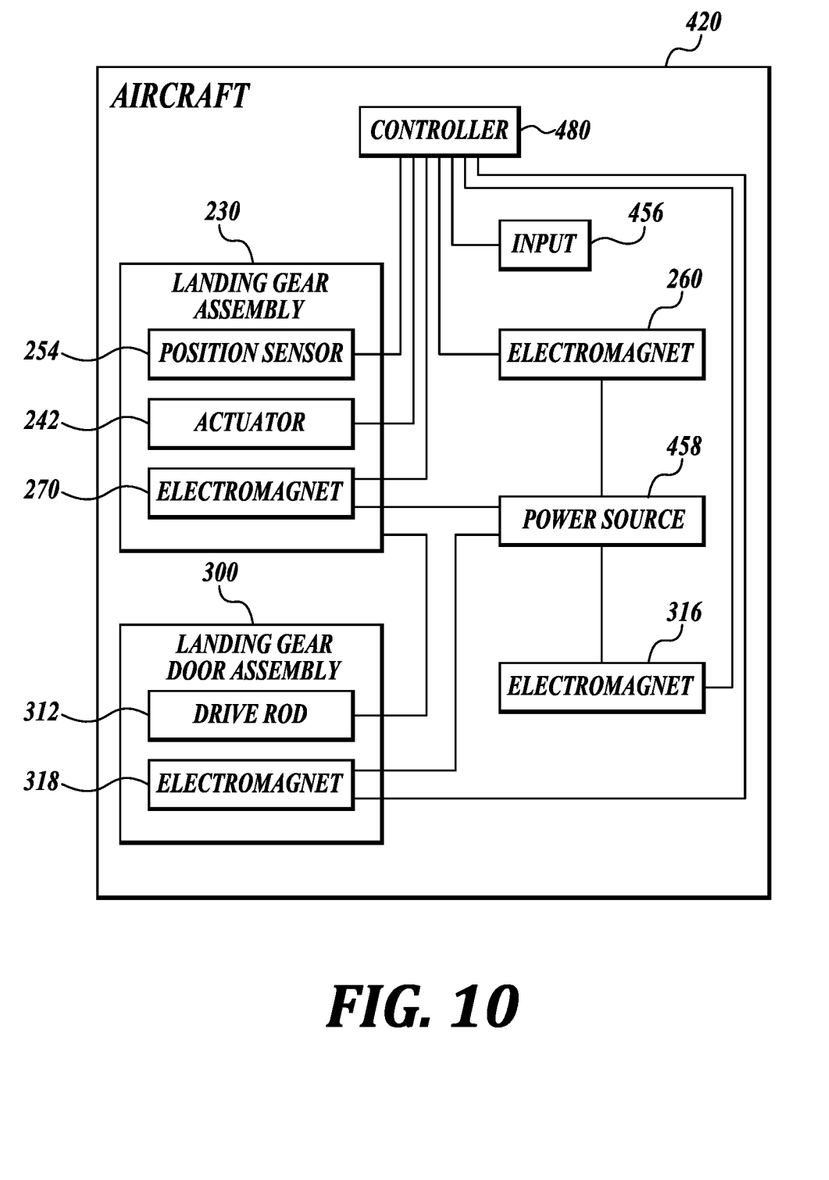
FIG. 10 shows a schematic diagram of a vehicle with the landing gear assembly of FIGS. 4 and 5 and the landing gear door assembly of FIGS. 8 and 9.

FIG. 10 shows an embodiment of an aircraft 420 that includes both of the previously disclosed landing gear assembly 230 and landing gear door assembly 300. In an embodiment, the landing gear assembly 230 and the landing gear door assembly 300 share a single controller 480, power source 458 (for the electromagnets), and input device 456. In an embodiment, the landing gear door assembly 300 is considered a part, i.e., a subassembly of, the landing gear assembly 230. In an embodiment, one or more of the common components are separate components, each component being associated with one or more of the assemblies. In an embodiment, the aircraft 420 includes any suitable number of landing gear assemblies 230 and landing gear door assemblies 300 that may include common components or separate components that work in conjunction with a single assembly or a subset of assemblies. These and other variations are contemplated and should be considered within the scope of the present disclosure.

Figure 11:
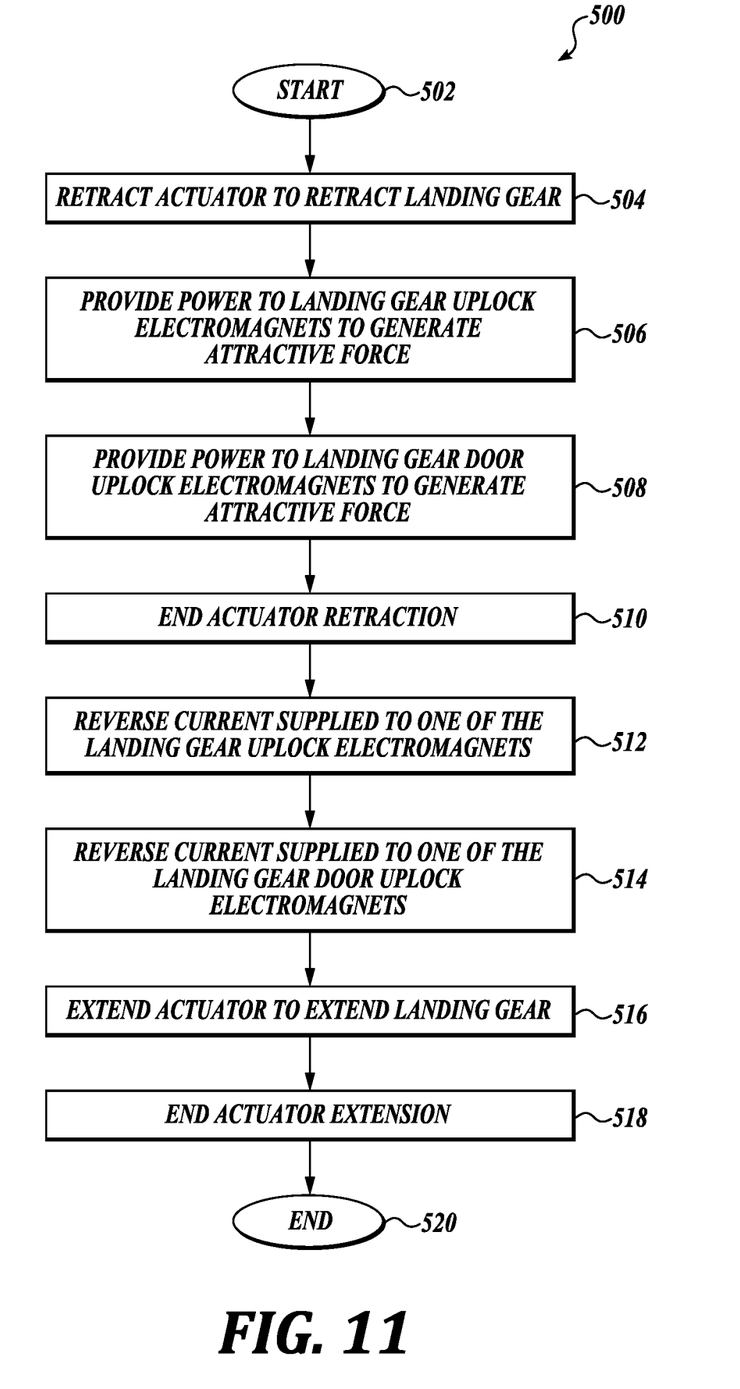
FIG. 11 shows a method of retracting and extending landing gear and landing gear doors that include uplocks according to embodiments of the present disclosure.

Referring now to FIG. 11, a representative method 500 for retracting and extending the landing gear assembly 230 and landing gear door assembly 300 of FIG. 10 is shown. The method 500 starts and block 502 and proceeds to block 504.

In block 504, the landing gear actuator 242 begins to retract the extended landing gear assembly 230. In an embodiment, retraction of the landing gear assembly 230 closes the landing gear door assembly 300. In an embodiment, a separate actuator retracts to close the landing gear door assembly. The method 500 then proceeds to block 506.

In block 506, the controller controls the power source 458 and electromagnets 260 and 270 so that the electromagnets are energized, and attractive forces are generated between electromagnets 260 and 270. The method 500 then proceeds to block 508.

In block 508, the controller controls the power source 458 and electromagnets 316 and 318 so that the electromagnets are energized, and attractive forces are generated between electromagnets 316 and 318. The method 500 then proceeds to block 510.

In block 510, retraction of the landing gear actuator 242 ends, and the landing gear assembly 230 is in the stowed position with the uplock assembly 250 engaged.

In block 512, extension of the landing gear assembly 230 and landing gear door assembly 300 begins. The landing gear uplock assembly 250 is disengaged by reversing a current to one of the landing gear uplock electromagnets, thereby generating a repelling force between electromagnets 260 and 270.

In block 514, the landing gear door uplock assembly 314 is disengaged by reversing a current to one of the landing gear uplock electromagnets, thereby generating a repelling force between electromagnets 316 and 318. The method 500 then proceeds to block 516.

In block 516, the landing gear actuator 242 extends to move the landing gear assembly 230 toward the deployed position. In an embodiment, extension of the landing gear assembly 230 opens the landing gear door assembly 300. In an embodiment, a separate actuator extends to open the landing gear door assembly 300.

In block 518, extension of the landing gear actuator 242 ends when the landing gear assembly 230 has reached the extended position. The method then proceeds to block 520 and ends.

It will be appreciated that the disclosed embodiments are exemplary only and should not be considered limiting. In some embodiments, the size, number, position, and actuation of the landing gear and landing gear doors can vary within the scope of the present disclosure. Similarly, the disclosed uplock assemblies can by utilized to secure various embodiments of landing gear and landing gear doors in the stowed/closed positions. These and other variations are contemplated and should be considered within the scope of the present disclosure.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A landing gear system for a vehicle, comprising:
  a landing gear assembly coupled to a body of the vehicle and configured for reciprocating motion between a retracted position and an extended position; and
  a fail-secure uplock assembly reciprocal between a locked state and an unlocked state, the uplock assembly comprising:
    a first electromagnet fixedly positioned relative to the body of the vehicle, the first electromagnet including a first solenoid configured to generate a first electromagnetic field with a reversible polarity and a first permanent magnet; and
    a second electromagnet fixedly positioned relative to a landing gear assembly component, the second electromagnet including a second solenoid configured to generate a second electromagnetic field with a reversible polarity and a second permanent magnet, wherein the first electromagnet is proximate to the second electromagnet when the landing gear assembly is in the retracted position, the first permanent magnet being attracted to the second permanent magnet, the first solenoid being attracted to the second solenoid when the uplock assembly is in the locked state, the first solenoid being repelled by the second solenoid when the uplock assembly is in the unlocked state.

2. The landing gear system of claim 1, wherein the landing gear component is a shock strut.

3. The landing gear system of claim 1, wherein the landing gear component is a landing gear door.

4. The landing gear system of claim 1, further comprising a controller in operable communication with the first and second electromagnets, the controller being programmed to reverse a current supplied to one of the first and second electromagnets to move the uplock assembly from the locked state to the unlocked state.

5. The landing gear system of claim 1, wherein the first electromagnet comprises a first electrically conductive wire coiled around a first ferromagnetic core.

6. The landing gear system of claim 5, wherein the second electromagnet comprises a second electrically conductive wire coiled around a second ferromagnetic core.

7. The landing gear system of claim 6, further comprising a power source configured to provide an electric current to the first and second electrically conductive wires.

8. The landing gear system of claim 7, further comprising a controller programmed to control a direction and a power of the current supplied by the power source to each of the first and second electrically conductive wires.

9. The landing gear system of claim 8, further comprising an input device in operable communication with the controller, wherein the controller is programmed to stop the current supplied to each of the first and second electrically conductive wires in response to a signal from the input device.

10. The landing gear system of claim 9, further comprising a position sensor configured to sense a position of the landing gear assembly component and to send a corresponding signal to the controller.

11. The landing gear system of claim 10, wherein the controller is programmed to control the power of the current provided to the first and second electrically conductive wires according to the position sensed by the position sensor.

12. A landing gear assembly for a vehicle having a fuselage, comprising:
a shock strut mounted to the fuselage for reciprocating movement between a stowed position and a deployed position,
an uplock configured to selectively retain the shock strut in the stowed position, the uplock comprising:
a first electromagnet and a first permanent magnet mounted to the shock strut;
a second electromagnet and a second permanent magnet fixedly mounted relative to the fuselage;
a power source configured to provide an electrical current to the first and second electromagnets; and
a controller programmed to selectively control a direction and power of the electrical current supplied to each of the first and second electromagnets,
wherein the first and second electromagnets are attracted to each other when the uplock is in an engaged state, and the first and second electromagnets are repelled from each other when the uplock is in a disengaged state.

13. The landing gear assembly of claim 12, wherein the first and second permanent magnets are attracted to each other, and a force repelling the first and second electromagnets is greater than a force attracting the first and second permanent magnets when the shock strut is in the stowed position and the uplock is in the disengaged state.

14. A landing gear system for a vehicle, comprising:
a landing gear assembly coupled to a body of the vehicle and configured for reciprocating motion between a retracted position and an extended position; and
a fail-secure uplock assembly reciprocal between a locked state and an unlocked state, the uplock assembly comprising:
a first electromagnet fixedly positioned relative to one of the body of the vehicle and a landing gear assembly component, the first electromagnet including a first solenoid configured to generate a first electromagnetic field with a reversible polarity and a first permanent magnet; and
a second permanent magnet fixedly positioned relative to the other of the body of the vehicle and the landing gear assembly component,
wherein the first electromagnet is proximate to the second permanent magnet when the landing gear assembly is in the retracted position, the first permanent magnet being attracted to the second permanent magnet, the first solenoid being attracted to the second permanent magnet when the uplock assembly is in the locked state, the first solenoid being repelled by the first permanent magnet when the uplock assembly is in the unlocked state.

15. The landing gear system of claim 14, wherein when the uplock assembly is in the unlocked state, a repelling force between the first solenoid and the second permanent magnet is greater than an attracting force between the first and second permanent magnets.

* * * * *